July 14, 1970 M. VOUTHIER 3,520,488
SPINNING REEL

Filed Nov. 1, 1968 3 Sheets-Sheet 1

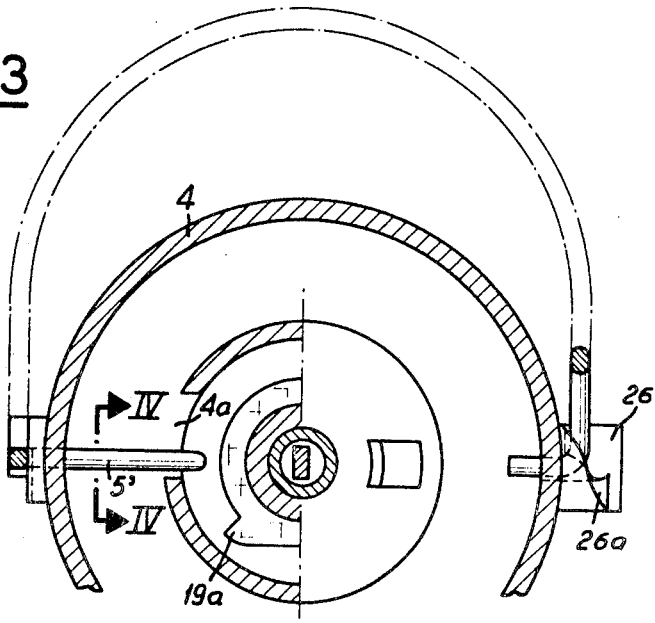
FIG.3
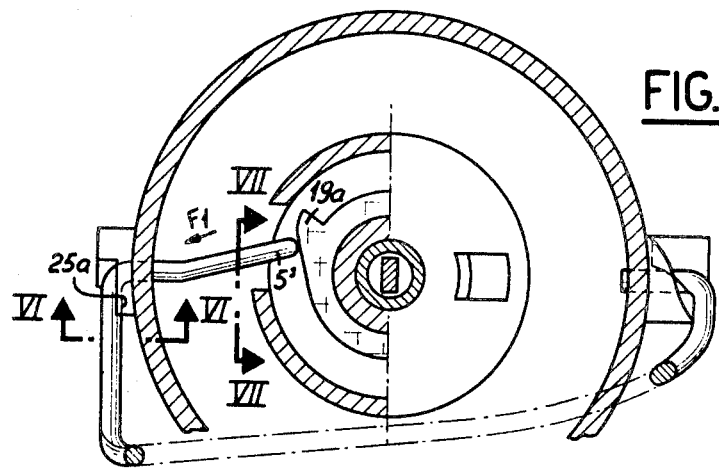
FIG.5
FIG.4     FIG.6     FIG.7
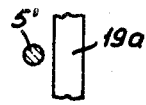 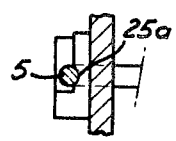 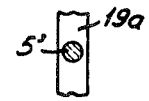

United States Patent Office 3,520,488
Patented July 14, 1970

3,520,488
SPINNING REEL
Marcel Vouthier, Cluses, France, assignor to Ets.
Carpano & Pons, Cluses, France, a company of
France
Filed Nov. 1, 1968, Ser. No. 772,544
Claims priority, application France, Jan. 15, 1968,
136,049
Int. Cl. A01k 89/00
U.S. Cl. 242—84.21                              5 Claims

ABSTRACT OF THE DISCLOSURE

This spinning reel has a line pick-up means rotated about a reciprocated spool to wind line thereon in an even manner. The pick-up means is rotated by crank operated gearing having an eccentric engaging a follower on a flat rod carrying the spool to reciprocate same. The pick-up means includes a drum having diametrically opposite projections serving to rotatably mount a wire-like pick-up bail for movement between casting and winding positions. The configuration of projections and bail are such that when the bail is manually shifted to casting position, its ends are spread apart creating stress which returns the bail to winding position by coaction between a stationary abutment and one end of the bail when the pick-up means is rotated. The spool is mounted on a flat rod by slotted support means clamped to said rod by an adjustable nut which also serves to regulate a torque limiting friction connection between the spool and support. The pick-up means and its associated driven gear are inserted through a front casing opening and held in assembled condition by cooperating retaining means on the casing and pick-up means.

---

The present invention relates to various improvements and modifications of constructions in spinning reels with fixed spool, in particular for the purpose of reducing to a minimum the cost price of such reels both from the aspect of the construction of their constituent parts and of their assembly as well as in the number of such parts and their fabrication.

To this effect, the invention is concerned with a reel of the type having a fixed spool or winding drum and a rotating outer drum with a pick-up member movable between two positions, characterized in that said winding drum is mounted on a plate having retaining means therefor, said plate being secured by fastening members on a flat axial rod being extended at its lower part by a socket ensuring the guiding of the plate-rod-drum in a hollow shaft having at its lower part driving teeth, this hollow shaft forming a body with the rotating drum and penetrating into a sleeve of the reel casing, the assembly of the said rotating drum and shaft having axial retaining means cooperating with the said casing sleeve which itself carries a member for releasing the pick-up.

One embodiment of the invention is given by way of non-limiting example with reference to the accompanying drawings in which:

FIG. 3 is a cross section taken along line III—III of FIG. 2.

FIG. 4 is a cross section taken along line IV—IV on FIG. 3.

FIG. 5 is a view similar to FIG. 3 for another position of its parts;

FIGS. 6 and 7 are cross sections of FIG. 5 taken along lines VI—VI and VII—VII respectively of that figure.

Figure 1:
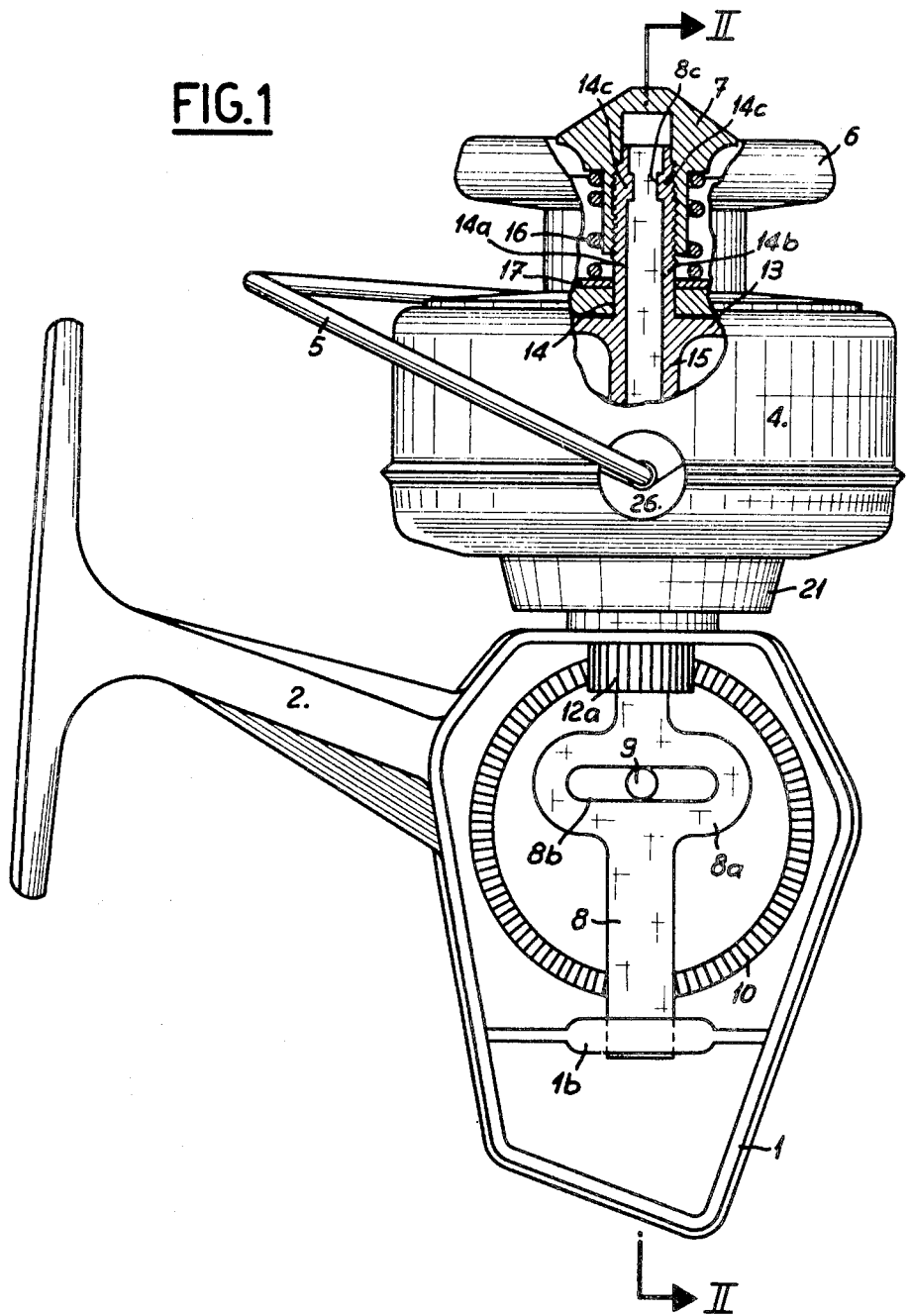
FIG. 1 is a side elevational view partly in section of a reel.

The reel shown in the drawing (FIGS. 1 and 2) is a spinning reel, with a housed fixed spool. It comprises, like most of the reels of the type to which it belongs, a casing 1, having a saddle plate 2 for receiving the fishing rod as well as a crank 3 and to the upper end of which is pivoted a drum 4 with a bail or pick-up member 5 surrounding a spool 6 maintained in place by means of a nut 7 and a spring 16.

This reel differs from others by various constructive features which permit large scale production and assembly which is extremely simple and does not require costly machining, screwing or rivetting.

In particular spool 6 is axially actuated in a reciprocating movement by a flat-stamped-rod 8 whose lower part is guided by slidable engagement in an opening 1a of a rib 1b of the casing offering a small plate 8a slotted horizontally at 8b to form a slide for an eccentric pin 9 projecting onto a gear 10 carrying a shaft 11 to which is secured crank 3. It is the rotation of gear 10 by the turning of this crank which occasions the alternating axial movement of rod 8 by sliding of pin 9 in slot 8b of plate 8a during turning of this pin.

Figure 2:
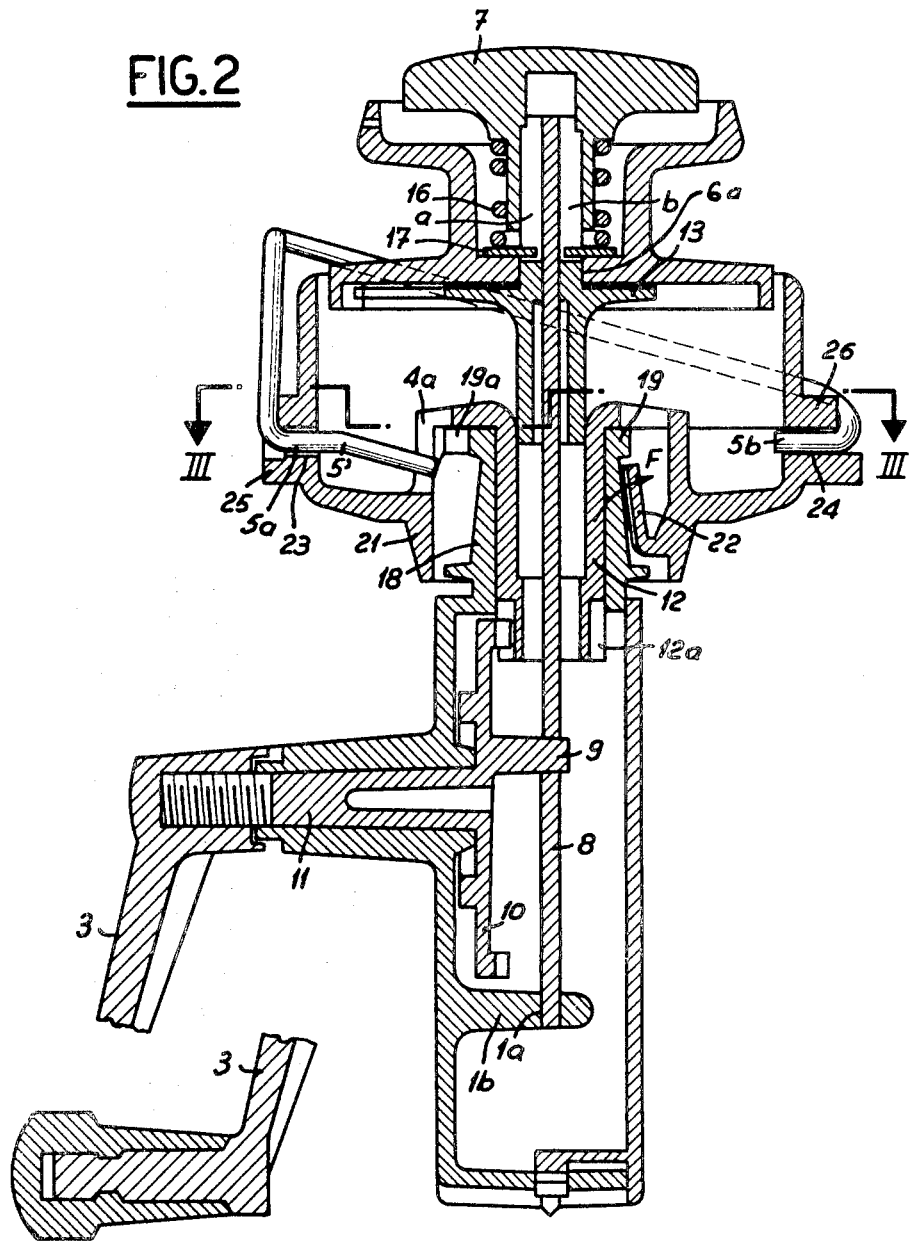
FIG. 2 is a cross section taken along line II—II in FIG. 1.

This rod 8 passes through barrel 12 fixed at the bottom of drum 4 engages next in the opening of a spool support which comprises a disc 13 on which rests spool 6, a first sleeve 14 projecting on the disc and passing through opening 6a in the spool, and a second sleeve 15 extending in a direction opposite to that of sleeve 14. This sleeve 15 has an outer diameter which corresponds to the opening of barrel 12 and engages freely in this barrel by its lower end even when the spool is in its raised position, as shown in FIG. 2.

One of the roles of barrel 12 consists in fact in ensuring guiding of the spool support 13–14–15 and therefore of rod 8 as will be seen presently.

In effect the opening in sleeve 14 has a shape and size which corresponds to that of said rod at its level and which is of rectangular cross section.

Additionally, sleeve 14 is cut longitudinally by two slots a and b which define jaws 14a and 14b each having a trapezoidal projection 14c; the outer surface of sleeve 14 is threaded.

The fastening of support 13–14–15 is effected by engaging projections 14c of jaws 14a and 14b in two notches 8c of rod 8, by slight bending of these jaws, and by next screwing on sleeve 14d the previously mentioned nut 7. This nut is adjustably threaded on sleeve 14 to also regulate the bias of spring 16 against non-rotatable, friction washer 17 which permits retarded rotation of the spool in an unwinding direction if the torque applied to it through the line exceeds a predetermined value.

In effect the previously mentioned barrel 12 serves in addition to guiding spool support 13–14–15 as a rotating shaft for the drum, and by means of the gear 12a provided on its lower part serves as a driven gear for the drum by meshing with gear 10. In known reels, these two operations are generally carried out by distinct parts assembled by any suitable means. Additionally, sleeve 12 is also separate from the drum.

In the reel of the invention, the drum, the sleeve 12 and its driving pinion advantageously form a single unit which can preferably be moulded from a plastic material.

The rotating of the drum on casing 1 is obtained by engaging barrel 12 in the opening of another sleeve 18 located on the upper part of casing 1 and which has on its outside surface a collar 19 mounted on its upper end, the outside profile of the part of sleeve 18 located under the collar 19 is truncated.

Collar 19 serves to axially block drum 4 on sleeve 18. In effect, barrel 12 of drum 4 projects on the bottom of an inverted cap 21 resting on collar 19 and on the inner lateral wall of which project, near its opening, three equidistant tongues 22 whose origin is approximately along an imaginary circle having a diameter greater than that of collar 19. In addition, the thickness of each tongue is selected in such a way that these tongues can be folded elastically in direction F. When drum 4 is not mounted on casing 1, the three tongues 22 in effect occupy a position which is much more inclined toward the rotational axis of the drum than is shown on the drawing. In order to mount this drum it suffices to engage barrel 12 in sleeve 18 so as to bring the three tongues to bear on collar 19. The axial pressure exerted on this drum is then accentuated in the direction of casing 1 in such a way that tongues 22 bend by contact with collar 19 and fade away by friction against this collar to again return elastically on the collar as soon as the drum occupies the position shown in the drawing. Drum 4 is then free to pivot in sleeve 18 while being maintained axially on this sleeve by the tongues. Such an assembly cannot be dismantled.

In the present reel, the pick-up member is formed by a metallic rod folded in the form of a hook or loop whose extremities $5a$ and $5b$ are bent and are pivotally engaged in coaxial openings 23 and 24 of projections 25 and 26 which project on the sides of drum 4 in diametrically opposed fashion. The pick-up member is mounted on projections 25 and 26 under a slight tension caused by a slight deformation so that the parts thereof near extremities $5a$ and $5b$ perfectly bear against the outer surfaces of the projections.

The outside surface of projection 25 (FIG. 6) offers in effect a groove $25a$ on the support zone of the pick-up when the same is in inoperative or casting position so that the pick-up member engages in this groove by elastic contraction and remains therein.

The other projection 26 has an outer surface shaped so as to form a helical ramp segment $26a$ (FIG. 3) causing an additional deflection to the pick-up member while guiding it in its rocking movement when this pick-up member is moved from its active-collecting or winding position (FIG. 3) into its inoperative position (FIG. 5). The additional tension to which the pick-up member is subjected when it is in this position is such that, if the part thereof resting in groove $25a$ of projection 25 is freed from this groove, the pick-up member then slips by itself on ramp $26a$ while returning into its collector position (FIG. 3) without the aid of any additional spring.

Various reels have a pick-up member mounted in this manner on their drum. The general arrangement of the reel according to the invention makes it possible to actuate the release of the pick-up member through a simple projection on sleeve 18.

For this purpose, the bent extremity $5a$ of the pick-up member is extended by a segment $5'$ deflected from the common axis at extremities $5a$ and $5b$ and extending inside drum 4 as well as outside the same through a window $4a$ (FIGS. 2 and 3). It will be understood that any rocking of the pick-up member translates itself into a conical trajectory member for segment extension $5'$ such that if the extremity of this extension $5'$ extends to a level lower than that of the pivoting axis of the pick-up member, in its operative-collecting position for example, this same extremity will rise above this level as soon as the pick-up member has been moved into inoperative position.

In the reel according to the invention, the collar 19 of sleeve 18, previously mentioned, can be provided with a projection $19a$ forming a cam and the extension $5'$ of the pick-up member may be given a length and an inclination such that the extremity thereof follows a circular path contained within a plane passing under projection $19a$ (FIG. 4) when the drum is rotated and the pick-up is in operative-collecting position while the circular path of the same extremity of extension $5'$ will meet projection $19a$ in the inoperative position of the pick-up member (FIG. 7).

FIGS. 3, 4, 5 and 7 illustrate very precisely the relative position of extension $5'$ and of projecting cam $19a$ for the two positions mentioned above, drum 4 and its pick-up 5 being arranged so as to move crosswise relative to casing 1 and to its projection $19a$.

In the second of these possibilities, extension $5'$ is moved as a result of encountering projection $19a$ in direction F1 (FIG. 5) by an amount which suffices to free the pick-up member from groove $25a$ in such a way that the pick-up member is then released and can return to its collecting position owing to its elasticity and by cooperation with ramp $26a$.

What is claimed is:

1. A spinning reel comprising a casing a first shaft having oppositely disposed ends mounted for rotation in said casing with one of said ends extending outside said casing; a crank mounted on said outside end for rotating said first shaft; gear means operatively connected to said other end of said first shaft for being driven thereby and including eccentrically connected means for translating the rotation of said first shaft into alternating reciprocating motion, a winding head rotatably mounted on said casing, a line spool mounted for reciprocal movement in said head, a stressed semi-circular pick-up member on said head having bent extremities and movable between an active and an inactive position, means on said head for releasing said member, means for imparting said reciprocal movement to said spool including a flat rod having an end portion provided with a transverse slot into which extend said eccentrically connected means: the other end of said rod fixed for rotation with a spool support, said support having a dependent sleeve, a hollow barrel integral in rotation with said head and slidably receiving therein said sleeve, said barrel having a lower part projecting in said casing and having a gear means meshing with said gear means; a second sleeve in the upper part of said casing receiving said barrel, the unit consisting of said barrel and said head having axial retaining means cooperating with said second sleeve.

2. Spinning reel according to claim 1, wherein said flat rod has an upper end provided with gripping means, and said spool support has on the upper part thereof a longitudinally split sleeve forming two elastic jaws, each of said jaws having on the inner surface thereof gripping means fitting on and cooperating with said gripping means of said rod, said jaws having external threads, said spool fitting on said rod and said jaws, and a nut for locking said jaws on said rod and holding said spool on said jaws.

3. Spinning reel according to claim 1, wherein said spool support has a spring for holding said spool, a nut being provided to retain said spool against said spool support, said spring bearing against said nut and forming torque-limiting means.

4. Spinning reel according to claim 1, wherein said axial retaining means includes at least one depending elastic tongue on said head and said second sleeve having on the outside surface thereof an annular projection, said elastic tongue bearing against said projection to prevent axial movement of said tongue and said head.

5. Spinning reel according to claim 1, wherein said head has a pair of diametrically opposite projections, said projections each having coaxial passages receiving said bent extremity of said pick-up member; one of said projections having a groove for receiving said pick-up member when the same is in casting position and the other projection having a ramp for placing said pick-up member when in the casting position under a tension such as to cause it to return into winding position when freed from said groove, the extremity of said pick-up pivoting in said boss carrying said locking groove terminating in an extension diverted from the pivoting axis of said extremity and movable along a given path; said second sleeve having cam means positioned in said path of said extension when said pick-up is in casting position in order to push back outwardly from said head said extension whereby said pick-up is freed from said locking groove and is able to go from said casting position to said winding position.

References Cited

UNITED STATES PATENTS

| | | | |
|---|---|---|---|
| 2,546,465 | 3/1951 | Martini | 242—84.21 |
| 2,773,655 | 12/1956 | Mandolf | 242—84.21 |
| 2,904,281 | 9/1959 | Jackson | 242—84.21 |

FOREIGN PATENTS

| | | |
|---|---|---|
| 737,191 | 9/1955 | Great Britain. |
| 324,996 | 12/1957 | Switzerland. |

BILLY S. TAYLOR, Primary Examiner

U.S. Cl. X.R.

242—84.5